US011391938B2

(12) United States Patent
Balagurusamy et al.

(10) Patent No.: US 11,391,938 B2
(45) Date of Patent: Jul. 19, 2022

(54) MICROLENS ADAPTER FOR MOBILE DEVICES

(71) Applicant: International Business Machines Corporation, Armonk, NY (US)

(72) Inventors: Venkat Balagurusamy, Suffern, NY (US); Brian Pear, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 412 days.

(21) Appl. No.: 16/539,439

(22) Filed: Aug. 13, 2019

(65) Prior Publication Data

US 2019/0384050 A1 Dec. 19, 2019

Related U.S. Application Data

(62) Division of application No. 15/694,903, filed on Sep. 4, 2017, now Pat. No. 10,416,432.

(51) Int. Cl.
| G02B 21/36 | (2006.01) |
| G02B 21/06 | (2006.01) |
| H04M 1/02 | (2006.01) |
| G02B 21/08 | (2006.01) |
| H04N 5/225 | (2006.01) |
| G02B 21/00 | (2006.01) |

(Continued)

(52) U.S. Cl.
CPC .......... *G02B 21/361* (2013.01); *G02B 7/027* (2013.01); *G02B 21/0008* (2013.01); *G02B 21/06* (2013.01); *G02B 21/086* (2013.01); *G02B 21/362* (2013.01); *H04M 1/0264* (2013.01); *H04N 5/2254* (2013.01); *H04N 5/23296* (2013.01)

(58) Field of Classification Search
CPC .. G02B 21/361; G02B 21/0008; G02B 21/06; G02B 21/086; G02B 21/362; G02B 7/027; H04M 1/0264; H04N 5/2254; H04N 5/23296
USPC ....................................................... 359/385
See application file for complete search history.

(56) References Cited

U.S. PATENT DOCUMENTS

| 8,516,688 | B2 | 8/2013 | Gore |
| 9,025,232 | B2 | 5/2015 | Kono et al. |

(Continued)

FOREIGN PATENT DOCUMENTS

| CN | 101930153 A | 12/2010 |
| CN | 102812387 A | 12/2012 |

(Continued)

OTHER PUBLICATIONS

Allowance Notice, Application No. 201780090976.4, dated Jun. 2, 2021.

(Continued)

*Primary Examiner* — Allen C Wong
(74) *Attorney, Agent, or Firm* — Garg Law Firm, PLLC; Rakesh Garg; Peter Edwards

(57) ABSTRACT

A microscope lens system includes a body having a surface, a microlens, and an aperture positioned between the microlens and the surface. In the embodiment, the body is configured to position a mobile device on the surface such that a camera lens of the mobile device is aligned with the aperture.

14 Claims, 13 Drawing Sheets

(51) Int. Cl.
*G02B 7/02* (2021.01)
*H04N 5/232* (2006.01)

(56) References Cited

U.S. PATENT DOCUMENTS

| | | | |
|---|---|---|---|
| 2010/0182607 A1* | 7/2010 | Chau | G01N 21/7703 385/12 |
| 2012/0084778 A1* | 4/2012 | Mall | G06F 9/3851 718/1 |
| 2016/0004057 A1 | 1/2016 | Lin et al. | |
| 2016/0147057 A1 | 5/2016 | Nagayama et al. | |
| 2017/0300598 A1* | 10/2017 | Akavia | G06F 30/20 |
| 2017/0330321 A1* | 11/2017 | Hsu | A61B 5/43 |
| 2018/0210323 A1* | 7/2018 | Ahn | G02B 6/0055 |

FOREIGN PATENT DOCUMENTS

| | | |
|---|---|---|
| CN | 202615038 U | 12/2012 |
| CN | 104990505 A | 10/2015 |
| CN | 204697149 U | 10/2015 |
| CN | 205691853 U | 11/2016 |
| JP | 2006208857 A | 8/2006 |
| JP | 2014131237 A | 7/2014 |
| JP | 3194285 U | 11/2014 |
| JP | 2017037309 A | 2/2017 |
| WO | 2008048612 A3 | 4/2008 |

OTHER PUBLICATIONS

Supplementary Search, Application No. 201780090976.4, dated Jun. 2, 2021.
OA1, Application No. 112017007129.1, dated Jul. 10, 2021.
OA1 Translation, Application No. 112017007129.1, dated Jul. 10, 2021.
Elkington & Fife, Application No. 1917834.2, Reply to Examination Report, dated Nov. 30, 2021.
OA2, English Translation, Publication No. CN110637454A, dated Mar. 17, 2021.
Allowance Notice Translation, Application No. 201780090976.4, dated Jun. 2, 2021.
List of all IBM related dockets. Appendix p. 2019.
Receive Rejection, Application No. 2019-564160, dated Aug. 5, 2021.
Receive Rejection Translation, Application No. 2019-564160, dated Aug. 5, 2021.
OA2, Publication No. CN110637454A, dated Mar. 17, 2021.
Application No. GB1917834.2, Examination Report, dated Sep. 30, 2021.
Application No. 2019-564160, Receive Rejection, dated Jan. 19, 2022.
Application No. 2019-564160, Receive Rejection English Translation, dated Jan. 19, 2022.
Intellectual Property Office, Examination Report, Application No. GB2113811.0, dated Apr. 8, 2022.

* cited by examiner

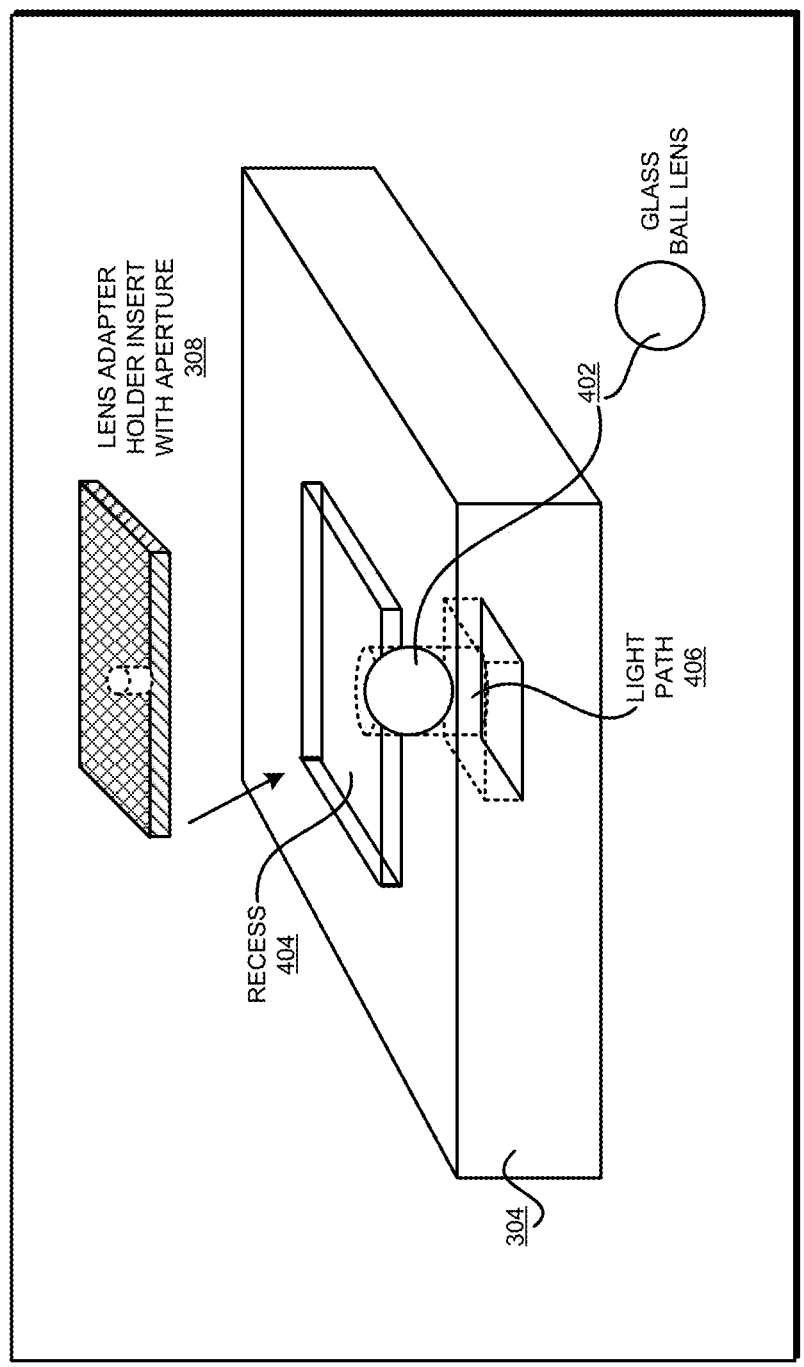

MICROLENS ADAPTER FOR MOBILE DEVICES

TECHNICAL FIELD

The present invention relates generally to a method, system, and computer program product for making a low cost microscope using existing camera-enabled mobile devices. More particularly, the present invention relates to a method, system, and computer program product for a microlens adapter for mobile devices.

BACKGROUND

Currently there are a large number of smart phone users around the world. Many of these smart phones are provided with high computing power, video streaming capabilities, high quality image capture capabilities and other processing capabilities. This presents an unprecedented opportunity for developing applications based on these capabilities, especially for sensing and imaging applications.

SUMMARY

The illustrative embodiments provide a method, system, and computer program product. An embodiment of a microscope lens system includes a body having a surface, a microlens, and an aperture positioned between the microlens and the surface. In the embodiment, the body is configured to position a mobile device on the surface such that a camera lens of the mobile device is aligned with the aperture.

In an embodiment, the microlens is one of a ball lens, a hemispherical lens, a hyperbolic lens, or an aspheric lens. An embodiment further includes a shroud configured to facilitate holding of the camera lens of the mobile device in alignment with the aperture. In an embodiment, the shroud is configured to be removably coupled to the body.

An embodiment further includes an insert configured to be removable positioned within a recess of the surface. In an embodiment, the insert includes the aperture.

In an embodiment, the body further includes a clip portion configured to fasten the body to the mobile device to facilitate holding of the camera lens of the mobile device in alignment with the aperture.

An embodiment further includes an object platform configured to hold an object at the focal plane of the microlens. In an embodiment, the object platform further includes a light source configured to illuminate the object.

In an embodiment, the mobile device is configured to capture an image of the object through the microlens.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts a schematic view of a microlens adapter in accordance with an illustrative embodiment;

DETAILED DESCRIPTION

Figure 1:
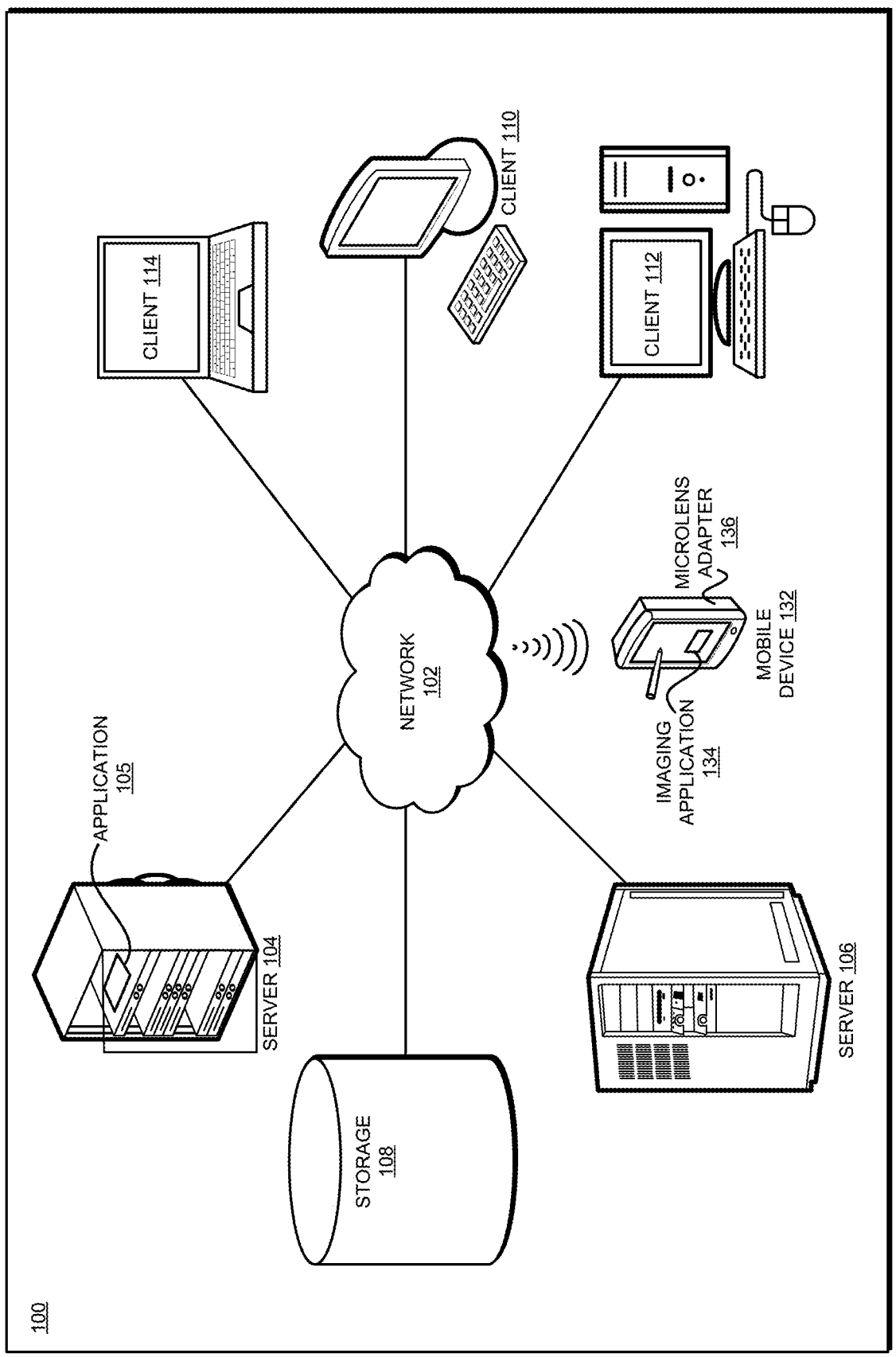
FIG. 1 depicts a block diagram of a network of data processing systems in which illustrative embodiments may be implemented.

Various embodiments include a microlens adapter for mobile devices that enable high resolution image capture. In particular embodiments, the microlens adapter includes a microlens that enables image capture of micron sized (millionth of a meter) objects using a mobile device having high magnification of, for example, 15× or larger (for comparison a human hair width is 100 micron). Various embodiments provide for a wide range of image capture and processing applications such as tracking microbead motion within a fluid, diamond defect mapping and imaging, imaging bacterial and other cellular organisms and counterfeit goods detection and protection.

Presently available microscopes with 1-micron or better resolution are generally custom equipment that cost many thousands of dollars and are difficult to move or relocate from one observation site to another as they are quite bulky. The illustrative embodiments recognize that the presently available tools or solutions do not address these needs/problems or provide adequate solutions for these needs/problems. The illustrative embodiments used to describe the invention generally address and solve the above-described problems and other related problems by providing a microlens adapter for mobile devices.

An embodiment includes a method that can be configured to produce many microlens configurations that have a micron resolution and a magnification from 15× and higher. Achieving similar optical resolution presently requires a microscope that costs approximately $15,000 in the market. Moreover, the whole setup of an embodiment is quite compact and easily portable for on-field applications relative to presently available high-resolution microscopes.

In particular embodiments, the microlens of the microlens adapter can distinguish micro particles that are of size 1 micron (1 millionth of a meter) which is not achievable by other lens adapters. A human hair is 100 micron in size for comparison. In one or more embodiments, the microlens adapter includes a housing having a ball lens in an aperture of the housing, and the housing is configured to be coupled to a mobile device to position a lens of a camera of the mobile device in alignment with the ball lens and an object to be imaged. In particular embodiments, the ball lens that has short focal length in the range of 0.5 to a few mm (millimeters) and is constructed of glass. In an embodiment, the microlens adapter is constructed, formed, or machined to accommodate the ball lens at a particular location to hold the ball lens in place. In one or more embodiments, the microlens adapter includes an opening through which light from the object enters the ball lens to form an image on the back side of the ball lens. The microlens adapter further includes a recess on an outer surface dimensioned to accept an insert having an aperture hole therethrough. In a particular embodiment, the recess and insert are of a rectangular shape. In particular embodiments, the aperture hole has a diameter of 0.9 mm acting as an aperture to achieve both an optical resolution of 1 micron as well to limit spherical and other aberrations in optical imaging. In one or more embodiments, the aperture hole is in alignment with the lens of the camera of the mobile device to allow one or more images of the object to be captured from the ball lens through the aperture hole with minimal image distortion.

Figure 2:
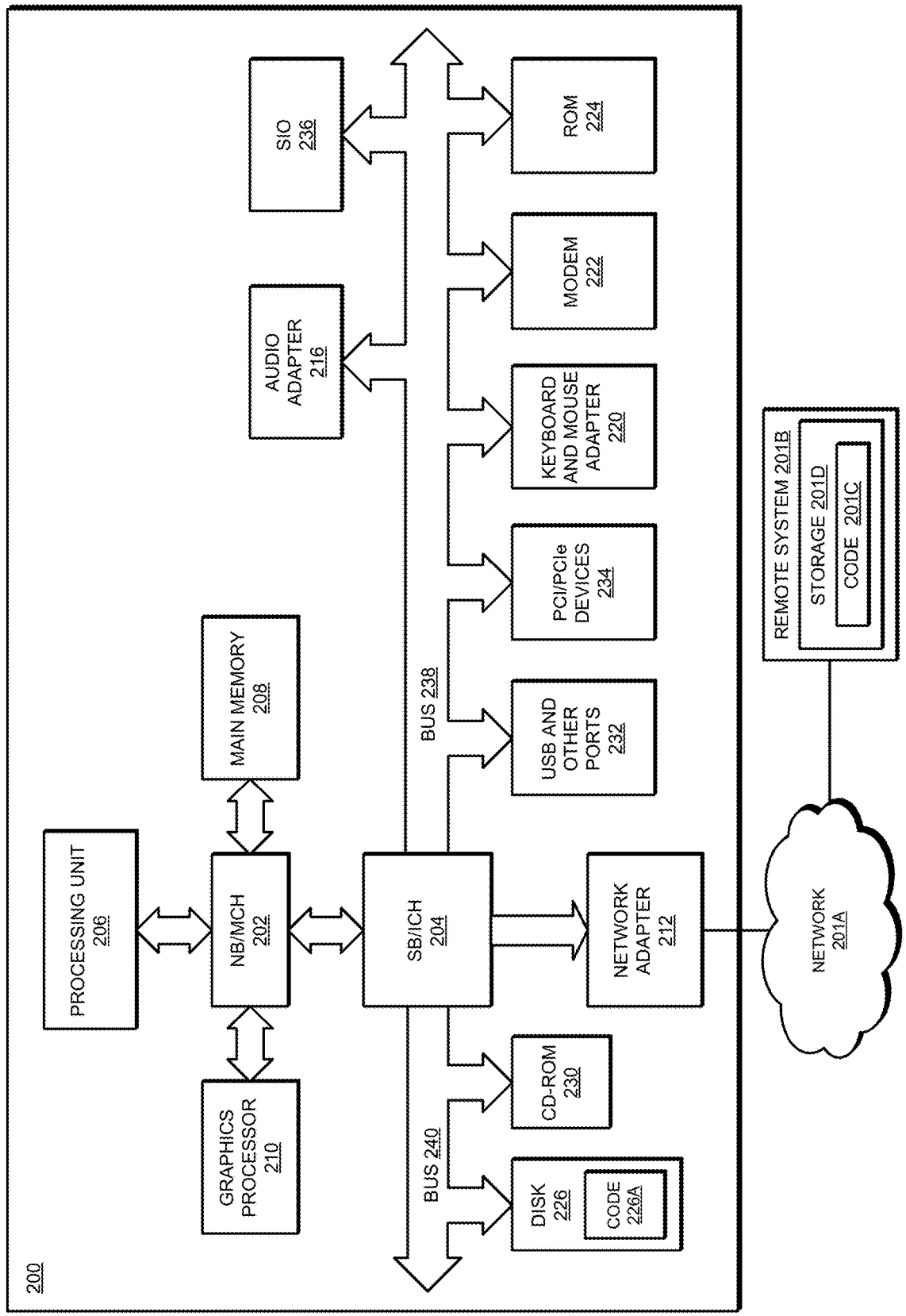
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Mobile device 132 is an example of a mobile device described herein. For example, mobile device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in mobile device 132 in a similar manner. Any data or information stored or produced in another data processing system in FIG. 1 can be configured to be stored or produced in device 132 in a similar manner. Mobile device 132 includes an imaging application 134 configured to capture one or more images or video sequences from a camera of mobile device 132. Mobile device 132 is further coupled to a microlens adapter 136 to facilitate capture of one or more images or videos sequences of an object through a microlens positioned within microlens adapter 136. Microlens adapter 136 is an example of a microlens adapter described herein.

Application 105 implements an embodiment described herein. For example, application 105 controls or instructs a manufacturing apparatus (not shown) to manufacture a microlens adapter that is usable in a manner described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3B:
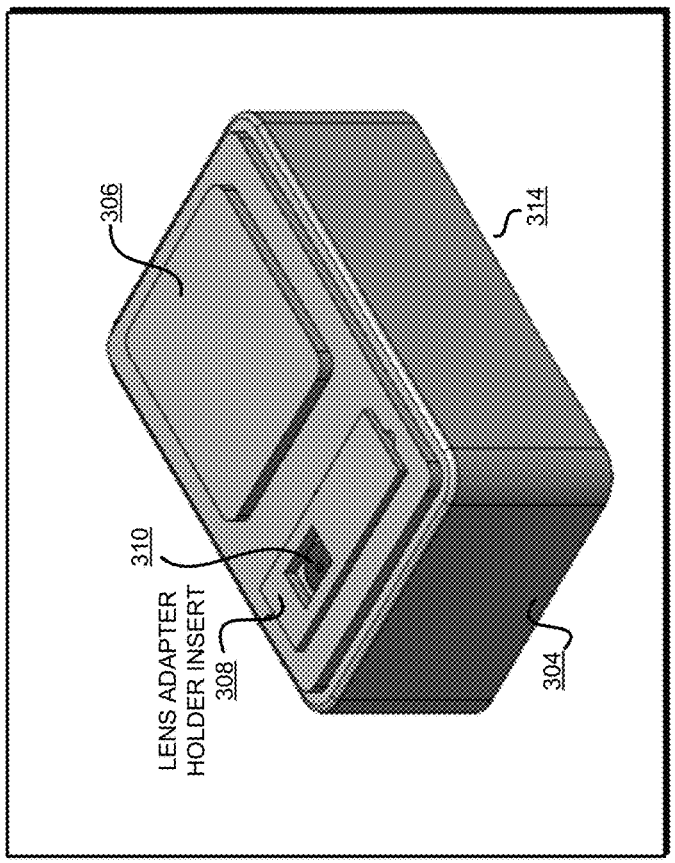
FIG. 3B depicts another example configuration of microlens adapter in accordance with an illustrative embodiment.
Figure 3A:
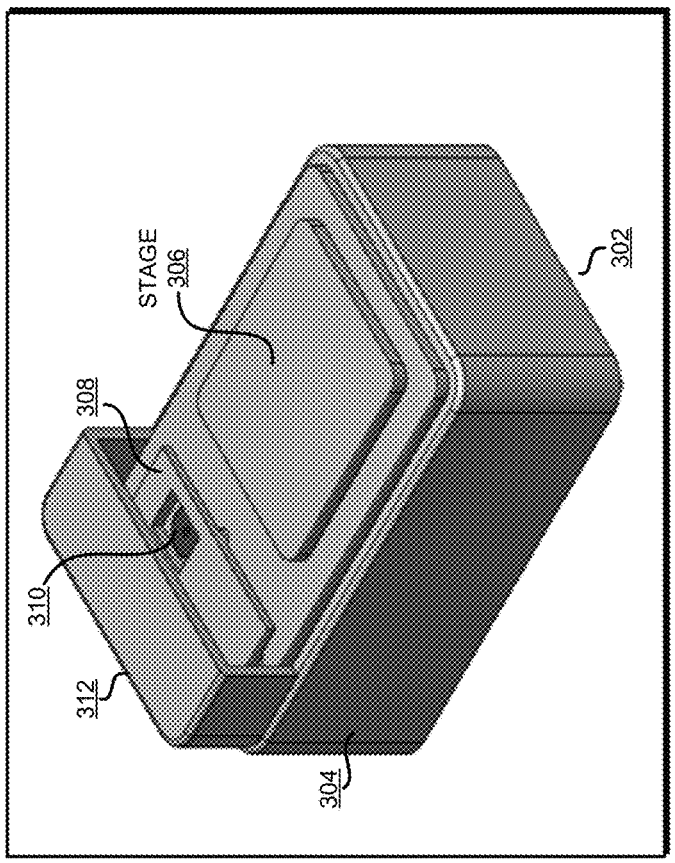
FIG. 3A depicts an example configuration of a microlens adapter in accordance with an illustrative embodiment.

FIG. 3A depicts an example configuration of microlens adapter 302 in accordance with an illustrative embodiment. Microlens adapter 302 is an example of a microlens adapter 136 described herein. Microlens adapter 302 includes a housing 304 having a stage 306 configured to support placement of mobile device 132 (not shown) upon housing 304. Microlens adapter 302 further includes a lens adapter holder insert 308 configured to be placed in and removable from a recess of housing 304. Lens adapter holder insert 308 further includes an aperture 310 in alignment with a microlens (not shown). The aperture 310 allows limiting the divergence of the light illuminating the sample from underneath to obtain better imaging conditions. In particular embodiments, lens adapter holder insert 308 is configured to be removable to facilitate insertion and removal of the microlens from housing 304. Housing 304 further includes a shroud 312 positioned above aperture 310 to facilitate holding of the camera of the mobile device in alignment with aperture 310. In addition, the shroud also prevents stray or ambient light from entering the sample chamber and microlens adapter facilitating the recording of the image of the object under observation. In particular embodiments, shroud 312 is configured to be removable to facilitate removal of lens adapter holder insert 308. In particular embodiments, the source of light to illuminate the sample for imaging can be placed inside the housing 304 in the bottom with either traditional mini LED bulbs or modern LED chips mounted in a printed circuit board wired to a battery or power source.

FIG. 3B depicts another example configuration of microlens adapter 314 in accordance with an illustrative embodiment. Microlens adapter 314 is an example of a microlens adapter 136 described herein. In the illustrated embodiment, microlens adapter 314 is similar to microlens adapter 302 of FIG. 3B except that shroud 312 of microlens adapter 302 is omitted from microlens adapter 314. Similar to the embodiment of FIG. 3A, microlens adapter 314 further includes lens adapter holder insert 308 configured to be placed in a recess of housing 304. Lens adapter holder insert 308 further includes an aperture 310 in alignment with a microlens (not shown). In particular embodiments, lens adapter holder insert 308 is configured to be removable to facilitate insertion and removal of the microlens from housing 304.

FIG. 4 depicts a schematic view of microlens adapter 136 in accordance with an illustrative embodiment. In the embodiment illustrated in FIG. 4, housing 304 includes a recess 404 in the top surface thereof, and a light path 406 extending through a portion of housing 304. In a particular embodiment, the aperture of lens adapter holder 308 is 0.9 mm in diameter. Light path 406 is configured to accept a microlens 402 and lens adapter 308 is configured to be placed within recess 404 of housing 304. In one or more embodiments, microlens 402 is a glass ball lens. In a particular embodiment, the glass ball lens has a diameter of 3.0 mm. In one or more embodiments, microlens adapter 136 is capable of achieving 1 micron optical resolution. In other embodiments, microlens 402 is a hemispherical lens. An advantage that may be offered by particular embodiments having a hemispherical lens is that aberration may be minimized. In still other embodiments, microlens 402 is a hyperbolic lens or aspheric lens.

Figure 5:
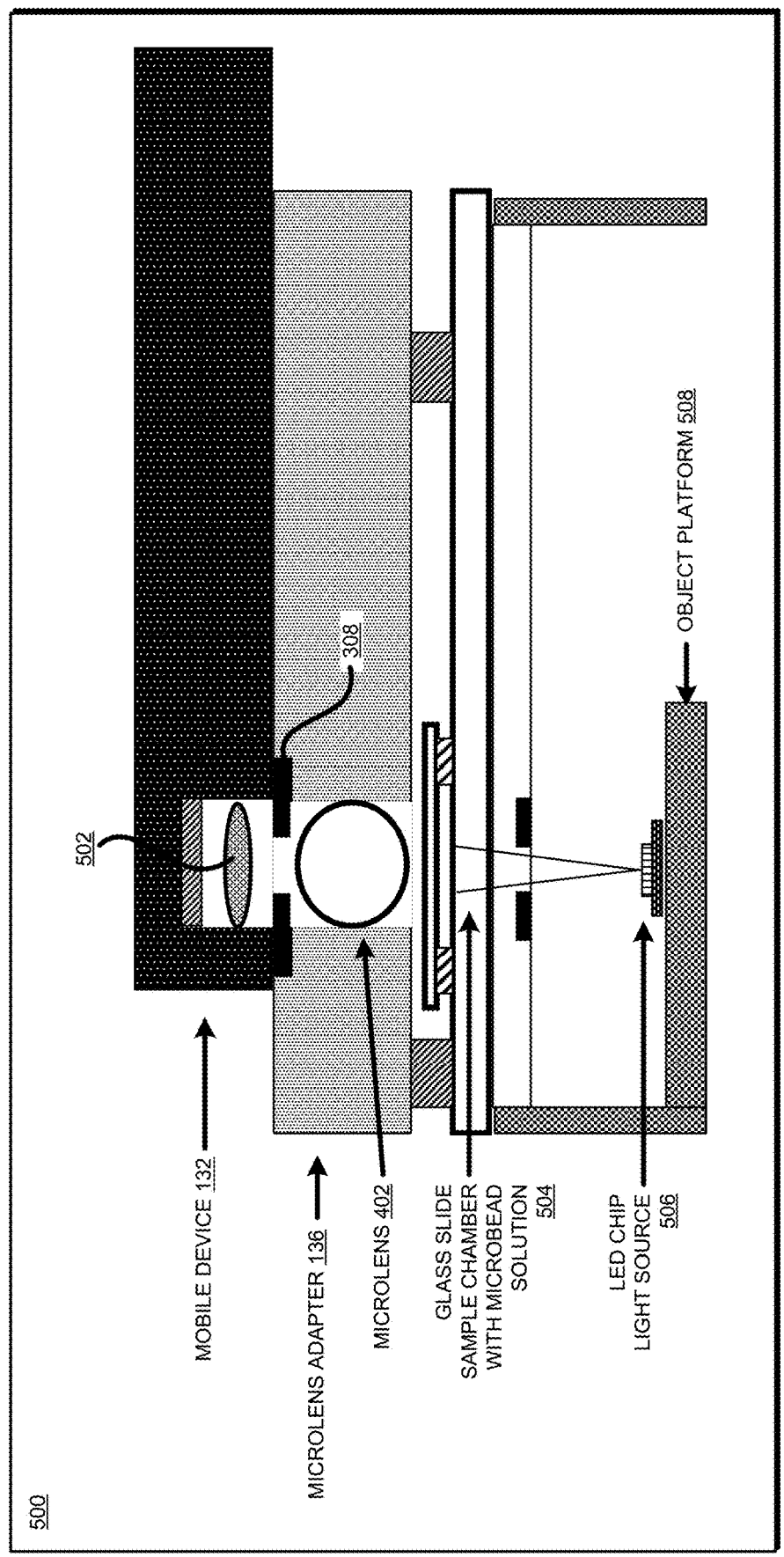
FIG. 5 depicts an example configuration in which a microlens adapter according to an embodiment is used for imaging microbeads.

FIG. 5 depicts an example configuration 500 in which microlens adapter 136 according to an embodiment is used for imaging microbeads and their motion with an example low-cost illumination setup that is portable and compact for field applications as compared to presently available microscopes that can produce similar results. In the example configuration of FIG. 5, mobile device 132 is coupled to microlens adapter 136 with camera lens 502 of mobile device 132 in alignment with the aperture of lens adapter holder insert 308 and microlens 402. The example configuration 500 further includes a subject object 504 in alignment with microlens 402. In the illustrated example of FIG. 5, subject object 504 is a glass slide sample chamber with a microbead solution. Microbeads are manufactured solid plastic particle that are typically less than 5 micrometers in size.

Example configuration 500 further includes a light source 506 positioned below subject object 504 upon an object platform 508. Light source 506 is configured to direct light upon and/or illuminate subject object 504 upward toward microlens 402 and camera lens 502. In a particular embodiment, light source 506 is a light emitting diode (LED) chip light source. In the embodiment, mobile device 132 is configured to capture still images and/or video images of subject object 504 through microlens 402 such that the images of subject object 504 are magnified when captured.

By locating the positions of microbeads in the video frames of images recorded with mobile device 132 according to the illustrative embodiment, microbead positions in subsequent frames can be tracked. By calculating the microbead position distributions, it can be ascertained whether the microbeads undergo Brownian motion. This analysis can also reveal if the microbeads are stationary, e.g., that is not moving by sticking to the bottom of the sample chamber coated with bead-binding coating or settling down in the bottom. In particular embodiments, microlens adapter 136 is designed and optimized for imaging microbead samples that are confined within 100 microns from the top of the glass slide using optical ray tracing.

Figure 6:
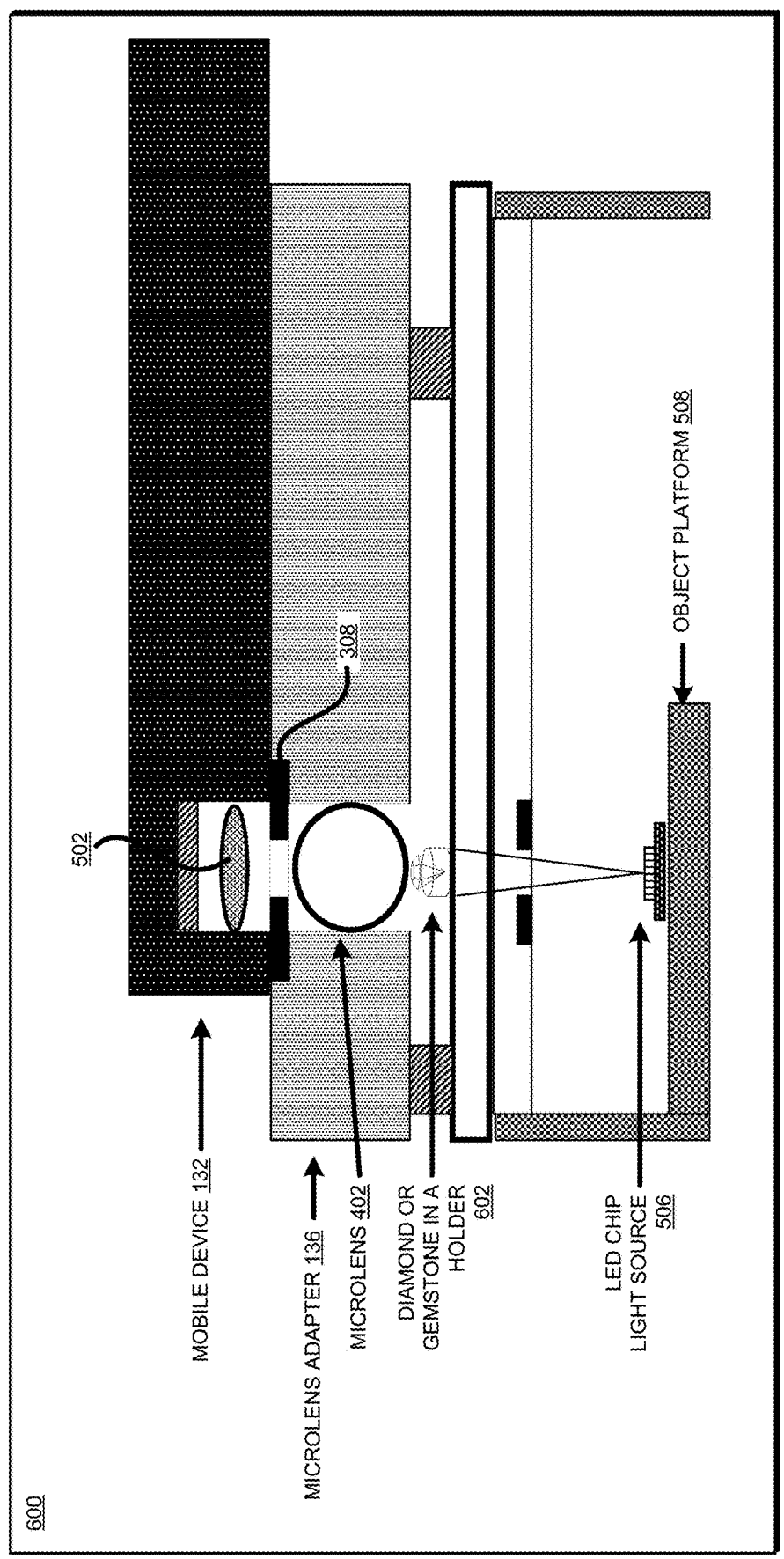
FIG. 6 depicts an example configuration in which a microlens adapter according to an embodiment is used for imaging the defects and inclusions within a diamond or other gemstone.

FIG. 6 depicts an example configuration 600 in which microlens adapter 136 according to an embodiment is used for imaging the defects and inclusions within a diamond or other gemstone with example 1 micron resolution. In the example configuration of FIG. 6, mobile device 132 is coupled to microlens adapter 136 with camera lens 502 of mobile device 132 in alignment with the aperture of lens adapter holder insert 308 and microlens 402. The example configuration 500 further includes a subject object 602 in alignment with microlens 402. In the illustrated example of FIG. 6, subject object 602 is a diamond or other gemstone in a holder. Light source 506 positioned below subject object 602 upon object platform 508 and is configured to direct light upon subject object 602 upward toward microlens 402 and camera lens 502. In the embodiment, mobile device 132 is configured to capture still images and/or video images of subject object 504 through microlens 402 such that the images of subject object 504 are magnified when captured in order to allow viewing of occlusions or other defects within the subject object 602.

Figure 7:
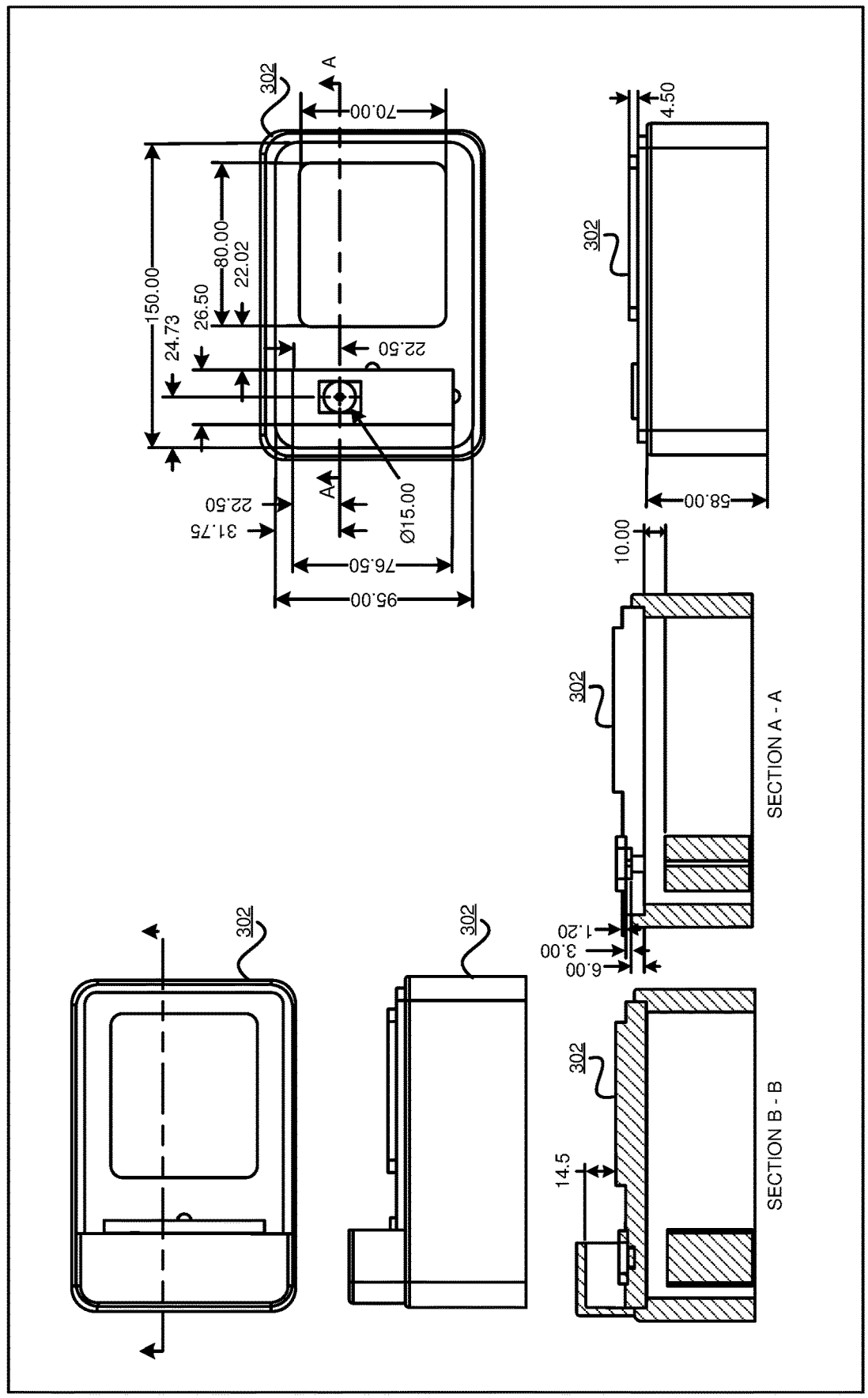
FIG. 7 depicts layout and cross-sectional views of a microlens adapter in accordance with an illustrative embodiment.
Figure 8:
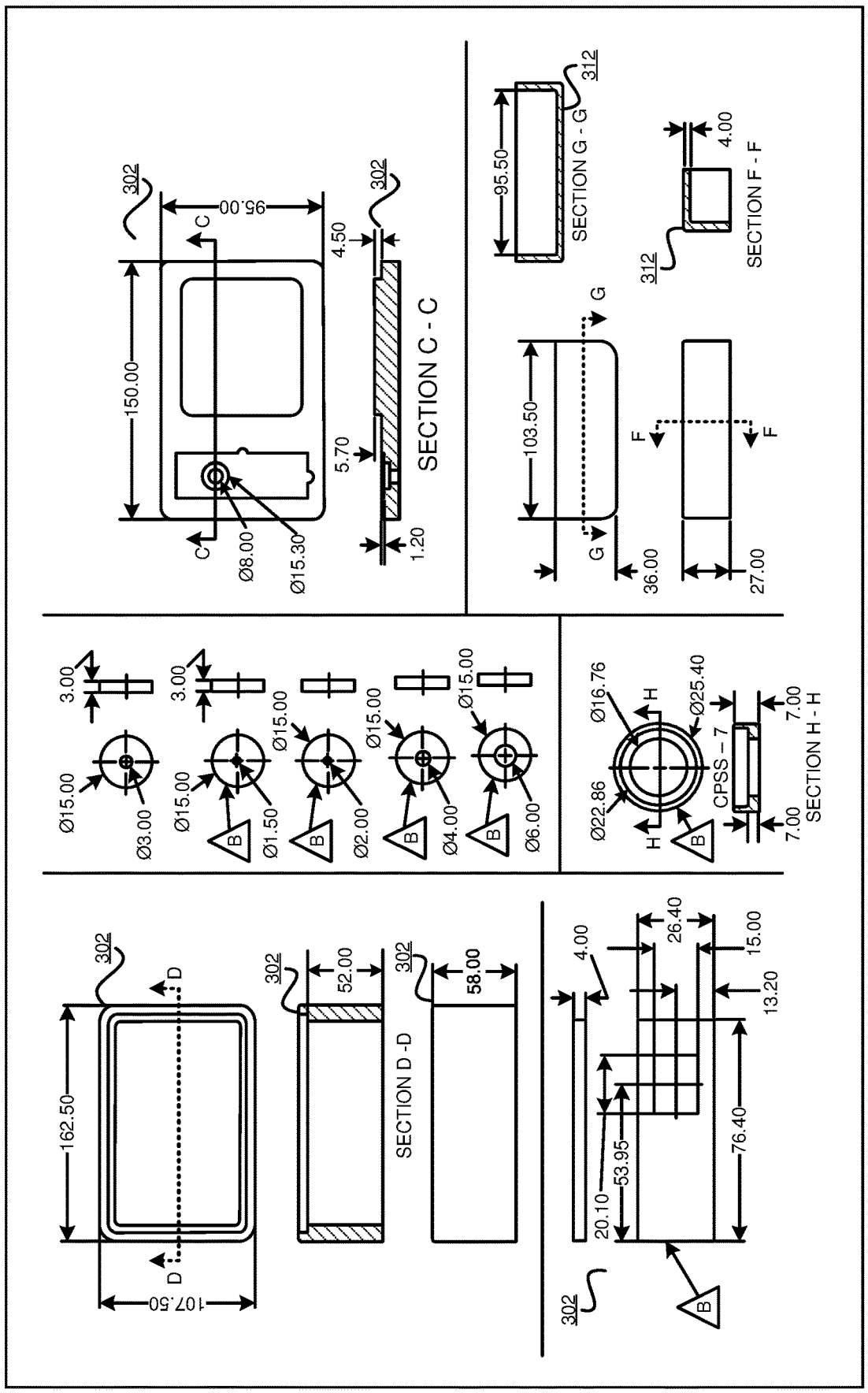
FIG. 8 depicts additional layout and cross-sectional views of a microlens adapter in accordance with an illustrative embodiment.

FIG. 7 depicts layout and cross-sectional views of microlens adapter 302 in accordance with an illustrative embodiment. FIG. 8 depicts additional layout and cross-sectional views of microlens adapter 302 in accordance with an illustrative embodiment.

Figure 9B:
FIG. 9A-9C depict an example configuration of a microlens adapter in accordance with another illustrative embodiment.
Figure 9A:
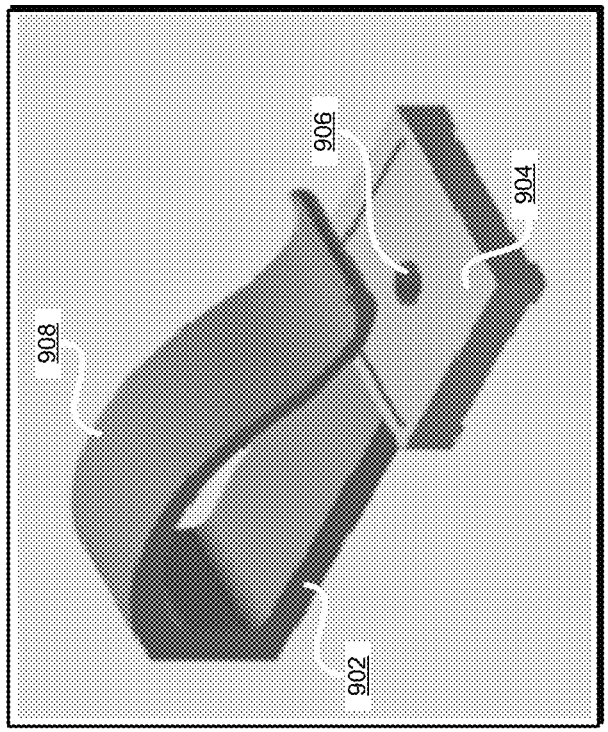

FIG. 9A depicts an example configuration of a microlens adapter 902 in accordance with another illustrative embodiment. Microlens adapter 902 is an example of a microlens adapter 136 described herein. Microlens adapter 902 includes a lens holder portion 904 having an aperture 906 in alignment with a microlens (not shown). Microlens adapter 902 further includes a clip portion 908 configured to allow microlens adapter 902 to be fastened to a surface of mobile device 132 to facilitate holding of the camera of the mobile device in alignment with aperture 906. In one or more embodiments, microlens adapter 902 further includes a light source configured to direct light upon and/or illuminate a subject object. In a particular embodiment, the light source is integrated with a bottom portion of lens holder portion 904.

Figure 9C:
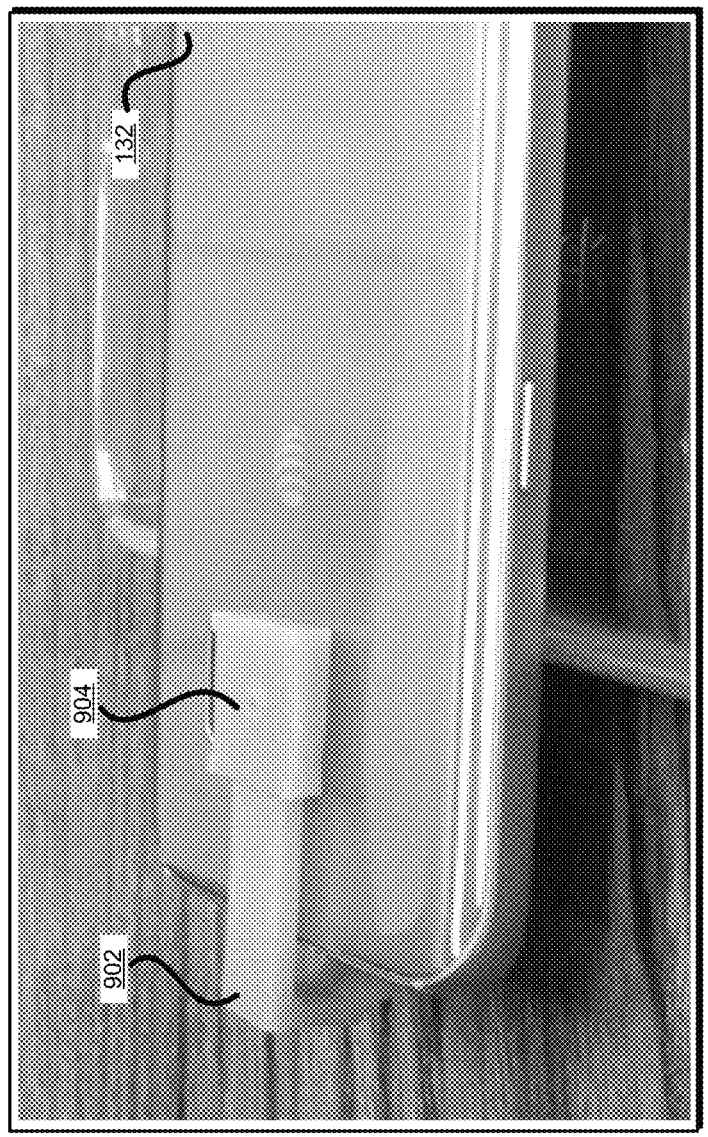

FIGS. 9B-9C depicts an example configuration of microlens adapter 902 fastened to mobile device 132. In the example of FIG. 9B, clip portion 908 is shown in contact with a rear-facing display screen side of mobile device 132. In FIG. 9C, lens holder portion 904 is shown in alignment with the camera lens of a front-facing camera side of mobile device 132.

Figure 10:
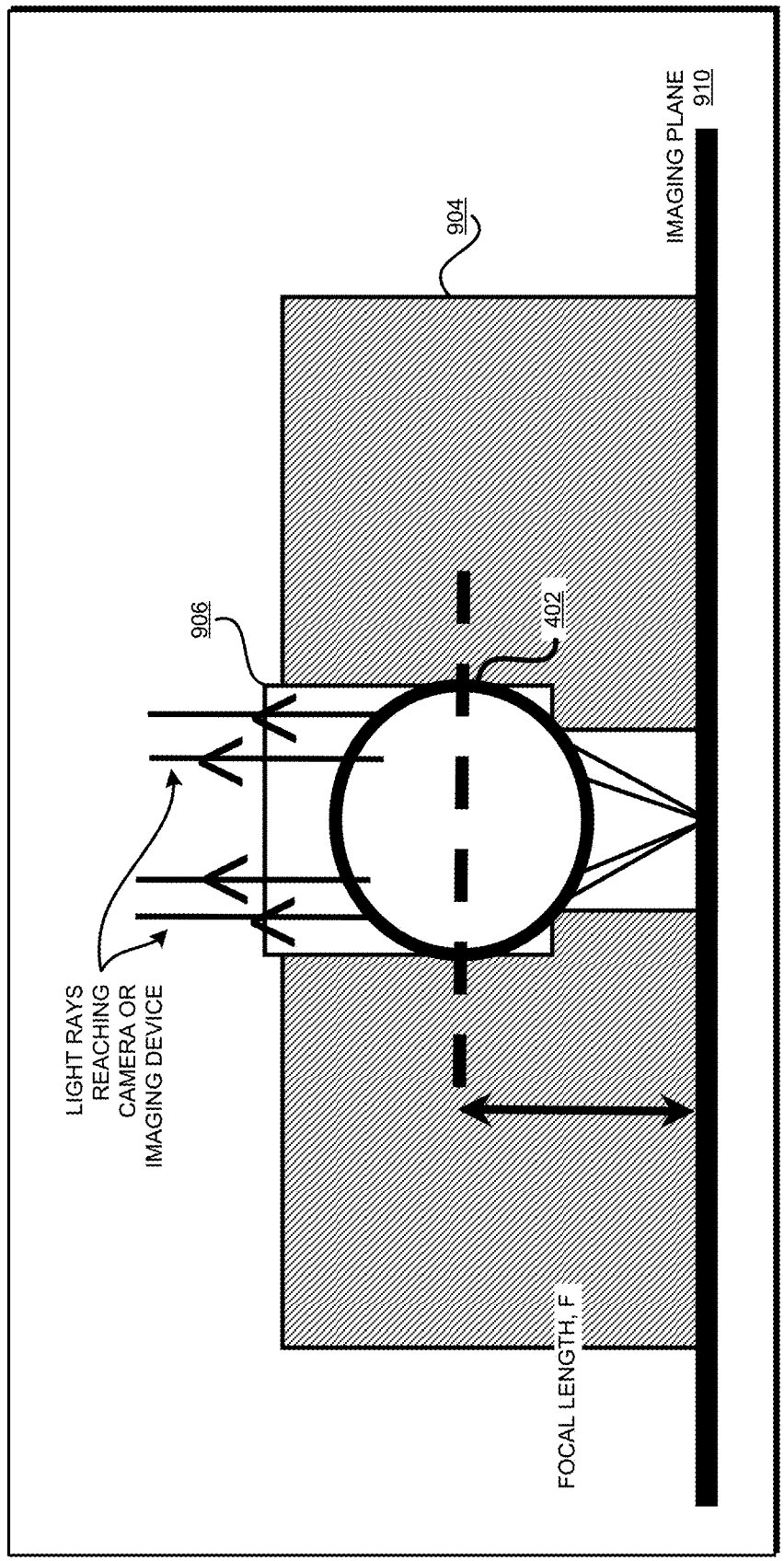
FIG. 10 depicts a schematic cross-section view of a microlens adapter in accordance with an illustrative embodiment.

FIG. 10 depicts a schematic cross-section view of microlens adapter 902 in accordance with an illustrative embodiment. In the embodiment illustrated in FIG. 10, microlens 402 is positioned within aperture 906 of lens holder portion 904 at a focal length f from an imaging plane 910 and having a center of focus upon imaging plane 910. In one or more embodiments, an object to be imaged by mobile device 132 is placed upon imaging plane 910 at the focal point. In one or more embodiments, microlens 402 is a glass ball lens.

Figure 11A:
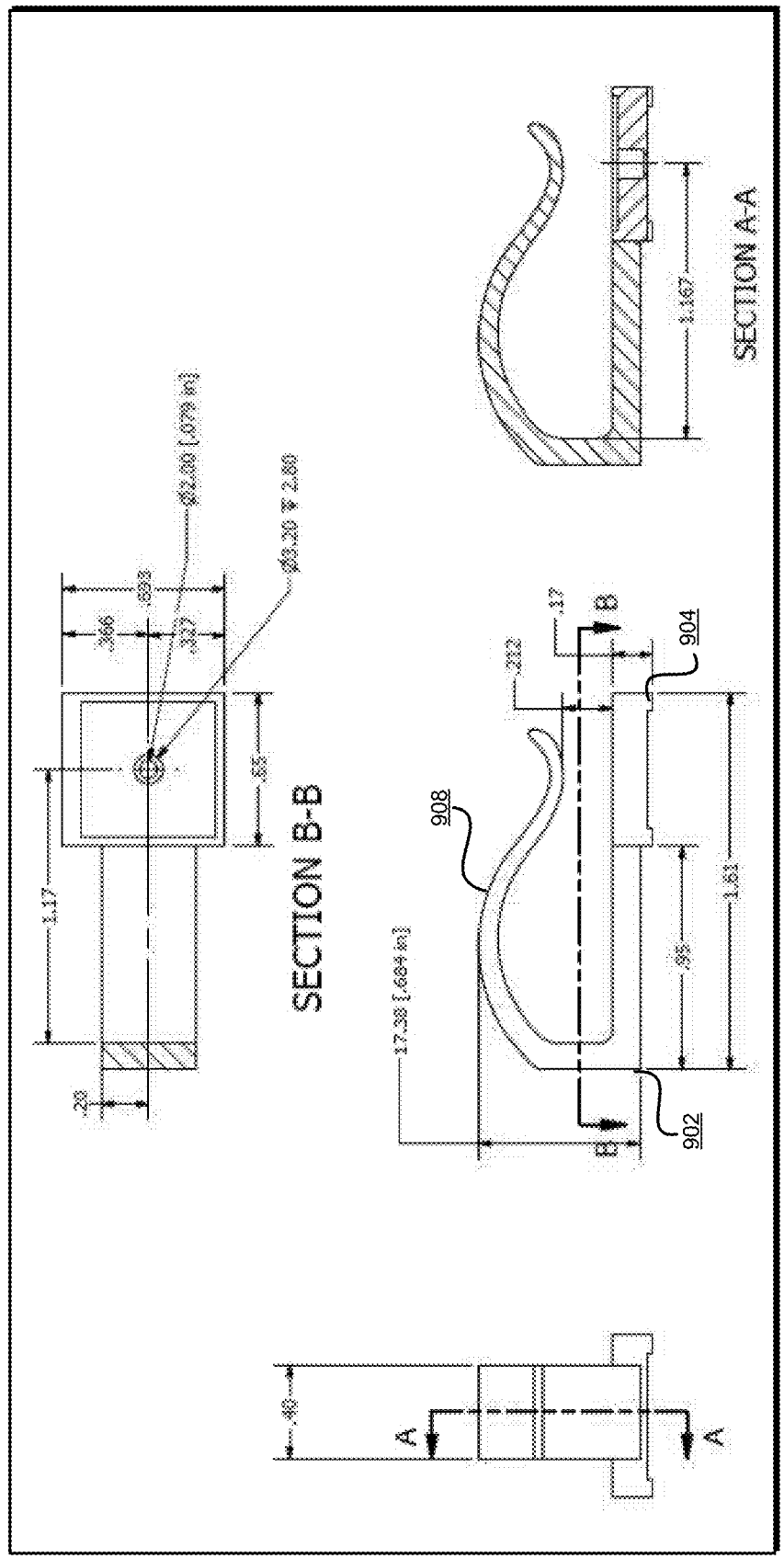
FIGS. 11A-11B depict layout and cross-sectional views of a microlens adapter in accordance with an illustrative embodiment.
Figure 11B:
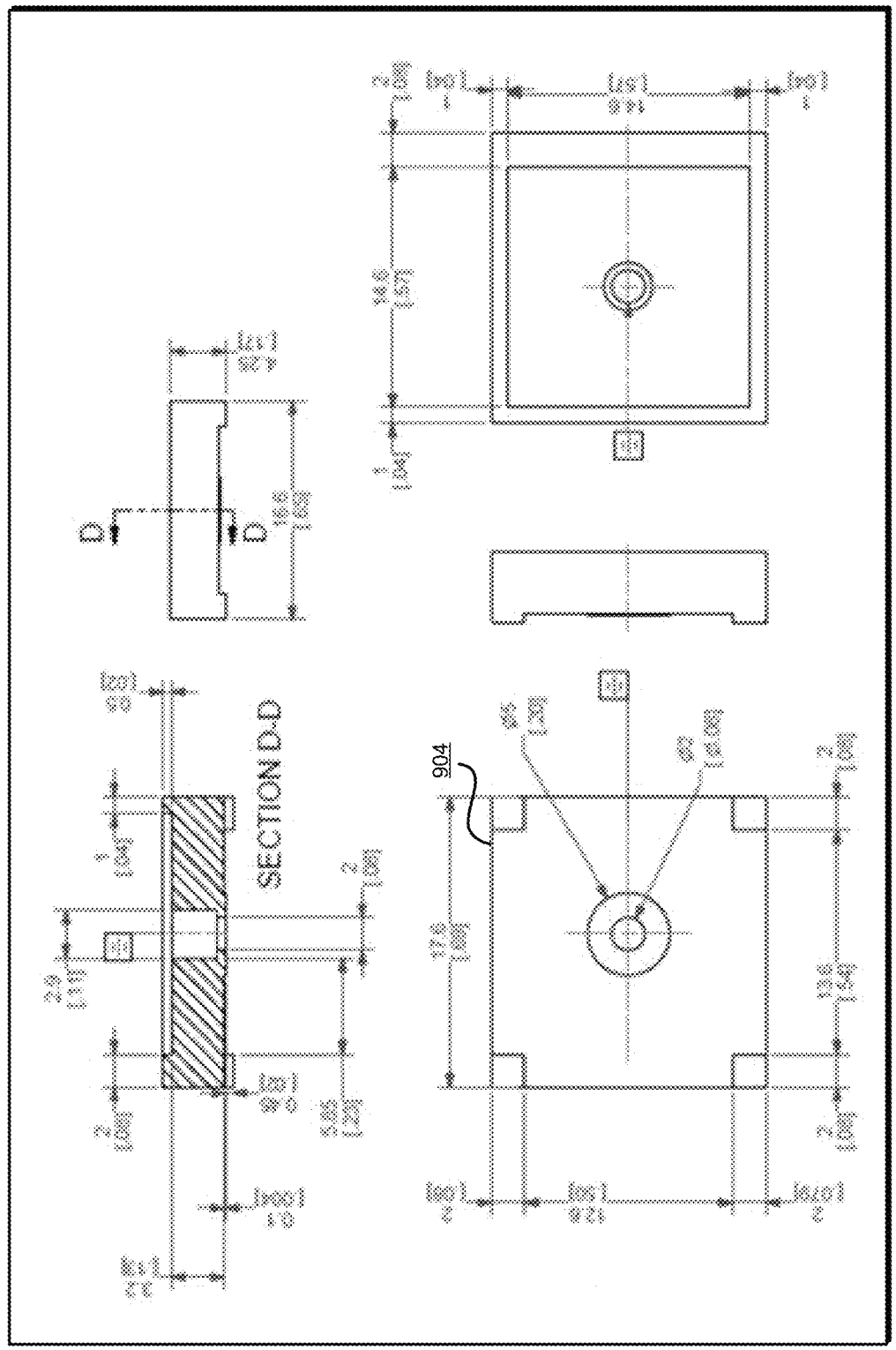

FIGS. 11A-11B depict layout and cross-sectional views of microlens adapter 902 in accordance with an illustrative embodiment. FIG. 11A depicts layout and cross-section views of microlens adaptor 902 including clip portion 908 and lens holder portion 904. FIG. 11B depicts layout and cross-section views of lens holder portion 904 of microlens adaptor 902.

Various embodiments of microlens adapter 136 described herein can be used in a number of applications in which magnified imaging of an object is desired. Example applications include, but are not limited to imaging defects and mapping of diamonds and other gems, drug or other packet recognition and counterfeit prevention, identification of microscopic features in art work and/or manufactured parts, biological cell imaging and counting, skin tissue imaging, detecting water pollutants, toxins, and/or large agglomerates of molecules, detecting plant leaf shape and type. In another example, embodiments of microlens adapter 136 can be used for detecting micropatterns such as periodic dot patterns or lithopatterns in a half-tone printing process that are visible when viewed under high magnification, or periodic dot patterns found in black and white and/or color images.

An embodiment can be implemented as a software application to control, guide, or instruct a fabrication machine or apparatus, to produce a microlens adapter for ubiquitous mobile devices, such as camera-equipped cellular phones. The application implementing an embodiment, or one or more components thereof, can be configured as a modification of an existing manufacturing system—i.e., a native application in the manufacturing system, as an application executing in a data processing system communicating with an existing manufacturing system over a local area network (LAN)—i.e., a local application on the LAN, as an application executing in a data processing system communicating with an existing manufacturing system over a wide area network (WAN)—i.e., a remote application on the WAN, as a separate application that operates in conjunction with an existing manufacturing system in other ways, a standalone application, or some combination thereof.

Another embodiment is the microlens adapter itself. Still another embodiment includes an observation configuration that uses a microlens adapter according to an embodiment. Another embodiment includes an observation configuration that uses a microlens adapter that has been manufactured using a software application according to an embodiment.

The manner of constructing or using a microlens adapter for mobile devices described herein is unavailable in the presently available methods. A method of an embodiment described herein, when implemented to execute on a device or data processing system, comprises substantial advancement of the functionality of that device or data processing system in fabricating and/or using a low-cost and portable microlens adapter for a variety of mobile devices.

The illustrative embodiments are described with respect to certain types of materials, shapes, orientations, experiments, usages, configurations, mobile devices, lens structures, illumination sources, observed specimen, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Thus, a computer implemented method, system or apparatus, and computer program product are provided in the illustrative embodiments for microlens adapter for mobile devices and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    instructing a manufacturing apparatus to fabricate an adapter body such that the body is configured to house a microlens and include an aperture positioned between the microlens and a surface of the body, wherein the surface is configured to hold a mobile device in a position such that a lens in the mobile device is aligned with the aperture; and
    instructing the manufacturing apparatus to fabricate an object platform configured to hold a sample chamber containing a microbead solution at a focal plane of the microlens, wherein the object platform further includes a light source configured to illuminate the microbead solution.

2. The method of claim 1, wherein the microlens is one of a ball lens, a hemispherical lens, a hyperbolic lens or an aspheric lens.

3. The method of claim 1, further comprising:
    instructing the manufacturing apparatus to fabricate a shroud configured to facilitate holding of a camera lens of the mobile device in alignment with the aperture.

4. The method of claim 1, further comprising:
    instructing the manufacturing apparatus to fabricate an insert configured to be removable positioned within a recess of the surface.

5. The method of claim 1, wherein the body further includes a clip portion configured to fasten the body to the mobile device to facilitate holding of a camera lens of the mobile device in alignment with the aperture.

6. The method of claim 1, wherein the object platform is configured to position a top surface of the sample chamber within 100 microns from a second surface of the body, the second surface comprising an opposite surface of the body from the surface.

7. The method of claim 1, wherein the microbead solution comprises a solution containing a plurality of microbeads, a microbead in the plurality of microbeads comprising a solid plastic particle less than 5 micrometers in size.

8. A computer usable program product comprising one or more computer-readable storage devices, and program instructions stored on at least one of the one or more storage devices, the stored program instructions comprising:
    program instructions to cause a manufacturing apparatus to fabricate an adapter body such that the body is configured to house a microlens and include an aperture positioned between the microlens and a surface of the body, wherein the surface is configured to hold a mobile device in a position such that a lens in the mobile device is aligned with the aperture; and
    program instructions to instruct the manufacturing apparatus to fabricate an object platform configured to hold a sample chamber containing a microbead solution at a focal plane of the microlens, wherein the object platform further includes a light source configured to illuminate the microbead solution.

9. The computer usable program product of claim 8, the stored program instructions further comprising:
    program instructions to cause the manufacturing apparatus to fabricate an insert configured to be removable positioned within a recess of the surface.

10. The computer usable program product of claim 8, wherein the body further includes a clip portion configured to fasten the body to the mobile device to facilitate holding of a camera lens of the mobile device in alignment with the aperture.

11. The computer usable program product of claim 8, wherein the computer usable code is stored in a computer readable storage device in a data processing system, and wherein the computer usable code is transferred over a network from a remote data processing system.

12. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

13. The computer usable program product of claim 8, wherein the object platform is configured to position a top surface of the sample chamber within 100 microns from a second surface of the body, the second surface comprising an opposite surface of the body from the surface.

14. The computer usable program product of claim 8, wherein the microbead solution comprises a solution containing a plurality of microbeads, a microbead in the plurality of microbeads comprising a solid plastic particle less than 5 micrometers in size.

* * * * *